United States Patent
Suzuki et al.

[11] 3,901,586
[45] Aug. 26, 1975

[54] DEVICE FOR VARYING MAGNIFICATION PRODUCED BY AN OPTICAL SYSTEM

[75] Inventors: Shigeru Suzuki; Hideaki Mochimaru, both of Yokohama, Japan

[73] Assignee: Ricoh Co., Ltd., Tokyo, Japan

[22] Filed: Dec. 19, 1973

[21] Appl. No.: 426,047

[30] Foreign Application Priority Data
Dec. 28, 1972 Japan.................................. 47-3474

[52] U.S. Cl................................. 350/202; 350/255
[51] Int. Cl.²..................... G02B 17/00; G02B 7/02
[58] Field of Search .......... 350/202, 203, 255, 285, 350/288

[56] References Cited
UNITED STATES PATENTS
3,088,368 5/1963 Tripp et al.......................... 350/202
3,317,269 5/1967 Madigan............................. 350/255

Primary Examiner—Ronald L. Wibert
Assistant Examiner—Conrad Clark
Attorney, Agent, or Firm—Cooper, Dunham, Clark, Griffin & Moran

[57] ABSTRACT

A device comprising a lens movable in the direction of its optical axis, and a reflector disposed in an inclined position on the optical axis of the lens and movable therealong, the lens and the reflector being interconnected by a link mechanism. The link mechanism is constructed to satisfy the following relation:

$$Y = X^2/f - X$$

where $f$ is the focal length of the lens, $X$ is the distance covered by the lens in its movement, and $Y$ is the distance covered by the reflector in its movement.

2 Claims, 6 Drawing Figures

DEVICE FOR VARYING MAGNIFICATION PRODUCED BY AN OPTICAL SYSTEM

BACKGROUND OF THE INVENTION

This invention relates to a device for effecting stepless variation of magnification produced by an optical system.

Heretofore, it has been customary interchangeably to use a plurality of lenses of different focal lengths or to use a variable focal length lens to accomplish the object of effecting variation of magnification produced by an optical system. These methods have the disadvantage of being high in cost. In another method known in the art, the surface of an original or the surface of a photosensitive sheet is moved along the optical axis of the optical system to effect variation of magnification produced by the optical system. This latter method has the disadvantage that the device used is very complex in construction and large in size. Still another method known in the art is that of effecting variation of magnification by using a cam to cause a reflector and a lens to move relative to each other under a predetermined relationship which has the disadvantage that errors are produced due to the lack of precision with which the cam is manufactured.

SUMMARY OF THE INVENTION

The present invention provides a device for effecting stepless variation of magnification produced by an optical system comprising a reflector and a lens interconnected by a link mechanism and interposed between the surface of an original and the surface of a photosensitive sheet for movement relative to each other under a predetermined relationship. The movement of the reflector is coupled to the movement of the lens based on the principle of geometrical optics, and this arrangement permits variation of magnification to be effected with a high degree of precision without using a cam requiring precise machine finishing and consequently high in cost.

According to the invention, there is provided a device comprising a lens and a reflector interconnected by a link mechanism for effecting stepless variation of magnification without moving the original and the photosensitive sheet in the direction of the optical axis, wherein the lens moves in one direction for a distance X along the optical axis, the reflector moves in the opposite direction for a distance Y by virtue of the link mechanism, and the distances X and Y satisfy the relation $Y = X^2/(f - X)$ where $f$ is the focal length of the lens.

DESCRIPTION OF A PREFERRED EMBODIMENT

Figure 1:
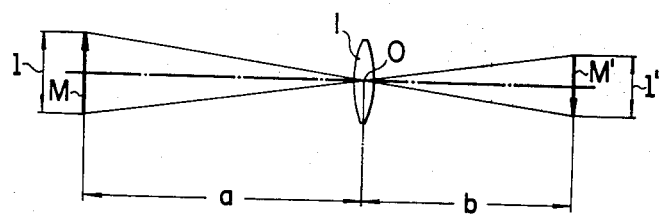
FIG. 1 is a front view of an optical system in explanation of the principle of effecting variation of magnification produced by the optical system of the present invention.

The principle of varying magnification produced by an optical system comprising a reflector coupled to a lens will first be described with reference to the movement of the reflector and lens relative to each other for predetermined distances. Then the invention will be described with reference to one embodiment thereof shown in the drawings in which the aforementioned principle of varying magnification is incorporated.

1. Principle of Varying Magnification

In FIG. 1, an object M of linear dimensions $l$ is shown to be reduced in size into an image M' of linear dimensions $l'$ by passing through a lens 1 of a focal length $f$. The lens 1 is considered to be a small thickness lens, so that the distance between the principal points is zero and the center of the lens is 0. In the figure, if the distance between the object M and the lens 1 is called $a$, the distance between the lens 1 and the image M' is called $b$ and the ratio of the linear dimensions of the image M' to the linear dimensions of the object M is called $m$, then the following relations hold:

$$1/a + 1/b = 1/f \tag{1}$$
$$m = l'/l = b/a \tag{2}$$

From the formulas 1. and 2., the following formulas can be obtained:

$$a = f(1 + 1/m) \tag{3}$$
$$b = f(1 + m) \tag{4}$$

As can be clearly seen in the formulas (3) and (4), it is necessary to vary the distances $a$ and $b$ when it is desired to vary the magnification $m$, and that it is accordingly necessary to vary the distance $a + b$ between the object M and image M'. It is when the distance $a$ is equal to the distance $b$ or when the linear dimensions of the image M' is equal to the linear dimensions of the object M that the distance $a + b$ between the object M and the image M' is minimized. When the linear dimensions of the image M' are increased or reduced as compared with the linear dimensions of the object M, the distance $a + b$ becomes greater as the ratio of the linear dimensions of the image to the linear dimensions of the object becomes greater. Let us consider the optical system based on this principle by referring to a reducing plate making machine which projects a reduced image of an original.

2. Optical System for a Plate Making Machine for Producing an Optical Image Smaller in Linear Dimensions than an Object It will be seen from FIG. 1 that one has only to move two of the three elements that is the object which may be the surface of an original, the image surface which may be the surface of a photosensitive sheet or the lens 1 in such a manner as to satisfy the aforementioned formulas (3) and (4) in order to effect variation of magnification. However, difficulty is encountered in moving the two surfaces in the direction of the optical axis of the lens and parallel to each other since the surface of the original and the surface of the photosensitive sheet are large in area and because of the limitations placed on the manufacturing of the machine, so that it would be preferable to keep the surface of the original and the surface of the photosensitive sheet fixed.

Figure 2:
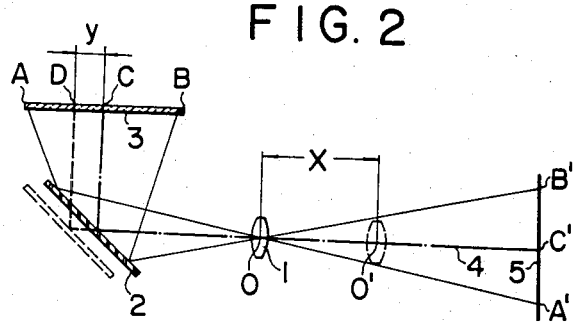
FIG. 2 is a front view of the optical system for a plate making machine using an optical system for producing an optical image smaller in linear dimensions than an object.

The image M' obtained as shown in FIG. 1 by the optical system shown therein is a reversed image of the object M. Thus this optical system is not suitable for use with a plate making machine for an offset duplicating apparatus. In order to obtain a normal image, an optical system is employed which includes as shown in FIG. 2 a reflector 2 disposed on the optical axis 4 of the lens 1. When variation of magnification is effected by using the optical system shown in FIG. 2, the surface of the original 3 and the surface of the photosensitive sheet 5 remain stationary and the reflector 2 and lens 1 move to respective positions shown in broken lines, so that the linear dimensions of the optical image can be reduced below the linear dimensions of the original. By moving the reflector 2 and lens 1 along the optical axis 4 of the lens, the distances $a$ and $b$ shown by the formula (1) can be varied. Thus, if the surface of the original 3 is maintained horizontal or parallel to the optical axis 4 and the surface of the photosensitive sheet 5 is maintained perpendicular to the optical axis 4, the reflector 2 has only to be disposed in a position in which it is inclined 45° relative to the optical axis 4.

Assuming that the positions of the reflector 2 and the lens 1 are shown in solid lines in FIG. 2 when the image formed on the photosensitive sheet is equal in size to the original image and that a point C on the original falls at a point C' on the photosensitive sheet, then, the distance between the surface of the original 3 and the lens 1 will be increased by $X + Y$ if the lens is moved rightwardly for a distance $X$ and the reflector 2 is moved leftwardly for a distance $Y$. A point D on the surface of the original 3 will be at the point C' on the surface of the photosensitive sheet after the lens and the reflector are moved to respective broken line positions, and, although not shown, a portion on the surface of the original 3 corresponding to a line AD will extend downwardly from the point C' for a distance $m \times \overline{AD}$ which may vary depending on the prevailing magnification $(m)$. Thus, the image of a point A on the surface of the original 3 will move upwardly from a point A' at which the image of the point A is formed when the size of the image to be formed on the photosensitive sheet is equal to the original image. Accordingly, the final image of the object or the original 3 is formed on the surface of the photosensitive sheet 5 on a reduced scale. In setting an original on the surface of the original 3, the point A shown in FIG. 2 is used as a reference at all times regardless of whether the final image obtained is equal to or different from the object in size. Variation of magnification effected by using the point A as a reference is to be described hereinafter.

3. Positions of the Reflector, Lens and Image at Different Magnifications

When the optical system shown in FIG. 2 is used, the surface of the original 3 and the surface of the photosensitive sheet 5 do not move in the direction of the optical axis of the lens even if magnification is varied, but the position of one end of the image on the surface of the photosensitive sheet 5 undergoes a change. Because of this, it is necessary to vary the vertical positions in which photosensitive sheets are placed in order that images may be formed at all times at a position in which the end of the image is spaced apart a predetermined distance from the forward end of the photosensitive sheet to which it is applied. To enable the relative positions of the reflector 2 and lens 1 to be better understood, their relative positions will be explained with reference to an optical diagram shown in FIG. 3 which indicates the optical system of FIG. 2 from which the reflector 2 is removed and in which only the image rays from one side of the optical axis are traced.

Figure 3:
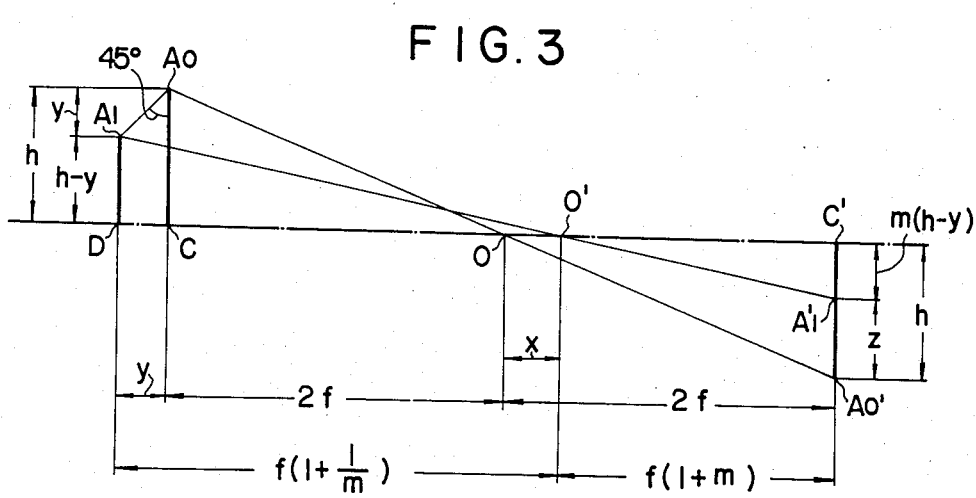
FIG. 3 is a ray diagram showing the effect of relative positions of the reflector, lens and optical image at different magnifications.

In FIG. 3, the symbol $h$ denotes the length of the original and the image when the image to be formed is equal to the original in size, and the symbol $z$ denotes the distance covered by the forward end of the photosensitive sheet in its movement when the lens 1 and the reflector 2 move for distances X and Y respectively with the forward end of the original being set at a fixed reference position at all times. The symbol 0' denotes the center of the lens 1 which has moved to a position spaced apart from the original position the distance X. The distances $a$ and $b$ from this position of the lens to the original and the image respectively are expressed by the formulas (3) and (4).

In FIG 3, X and Y can be expressed by the following formulas:

$$X = 2f - f(1 + m)$$
$$= f - fm \quad (5)$$
$$Y = f(1 + 1/m) + f(1 + m) - 4f$$
$$= f(m + 1/m - 2)$$
$$= f/m \cdot (m^2 - 2m + 1)$$
$$= f/m(m - 1)^2 \quad (6)$$

The formula (5) represents the distance covered by the lens in its movement while the formula (6) represents the distance covered by the reflector in its movement. By substituting in the formula (6) $m = f - X/f$ obtained from the formula (5), the following relation can be obtained:

$$Y = \frac{f^2}{f - X} \left( \frac{f - X}{f} - 1 \right)^2$$
$$= \frac{f^2}{f - X} \left( \frac{-X}{f} \right)^2$$
$$= \frac{X^2}{f - X} \quad (7)$$

In FIG. 3, the forward end Ao of the original is disposed in a position Ao' on the photosensitive sheet. If the lens and the reflector are moved for the distances X and Y respectively, then the position of the forward end Ao' of the image shifts to a position Al', the distance covered by the forward end of the image being $h - m(h - Y)$. The length $h$ which corresponds to the $\overline{AC}$ in FIG. 2 may be set at any value as desired to suit the layout. Preferably, the length $h$ is about half the length of the original at its maximum.

In FIG. 3, the length of the original is represented by $\overline{AlD}$ when the reflector covers the distance Y in its movement. This would make one wonder whether the length of the original is smaller than its length AoC when no magnification is effected. It should be understood that there is no change in the length of the original actually, and that the aforementioned phenomenon is due to the fact that the distance from the optical axis to the forward end of the original has undergone a change because the reflector is moved while the forward end is held in the reference position.

4. Principle of Movements of the Lens and Reflector

Heretofore, it has been customary to use a cam or a link which is actuated by means of a magnification varying dial or a handle as means for moving the lens and the reflector conjointly in a plate making machine or copying apparatus capable of varying magnification produced by an optical system. The use of a cam enables the lens and the reflector to move in complex movement. However, difficulty is experienced in manufacturing a cam satisfactory for the required specifications and an error tends to occur when the cam used lacks precision in machine finishes. According to the invention, variation of magnification is effected by means of a link mechanism. The principle on which the invention is based is shown in FIG. 4.

Figure 4:
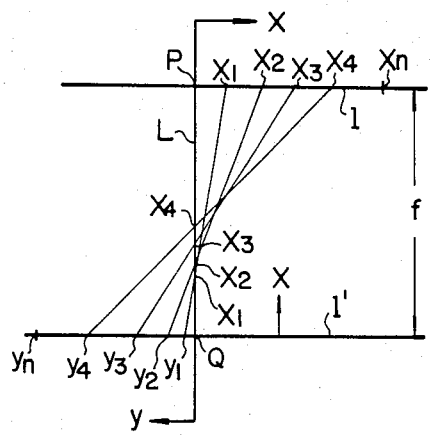
FIG. 4 and FIG. 5 are diagrams showing the principle of movements of the lens and the reflector.

In FIG. 4, two parallel lines $l$ and $l'$ are spaced apart from each other a distance corresponding to the focal length of the lens 1, and a line L normal to the lines $l$ and $l'$ intersects them at points P and Q respectively. The distances $X1, X2 \ldots Xn$ covered by the lens in its movement starting from the points P and Q and taking place on the lines $l$ and L are as shown in the figure. $X1, X2 \ldots Xn$ represent the values for X at different magnifications obtained by the formula (5), and $\overline{PX1}=\overline{QX1}, \overline{PX2}=\overline{QX2}, \ldots$. If the points of intersections of lines passing through $X1-X1, X2-X2 \ldots Xn-Xn$ on the lines $l$ and L with the line $l'$ are called $Y1, Y2 \ldots Yn, \overline{QY1}, \overline{QY2} \ldots \overline{QYn}$ represent the distances Y covered by the movement of the reflector corresponding to the distances X covered by the movement of the lens at different magnifications. The aforementioned proposition will now be demonstrated.

Figure 5:
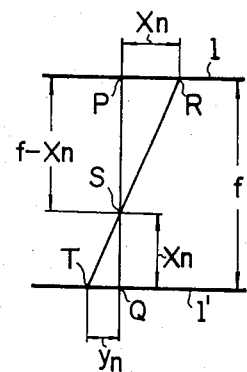

In FIG. 5, the triangle PSR and the triangle QST are similar figures, so that $(f - Xn):Xn = Xn:Yn$. From this formula, the following formula is obtained:

$$Yn = X^2n/f - Xn \qquad (8)$$

The formula (8) is similar to the formula (7). As a result, if the lens and the reflector are moved by means of a mechanism satisfying the principle shown in FIG. 4, it will be possible to effect stepless variation of magnification as shown in FIG. 3.

5. Mechanism for Moving the Lens and Reflector

Figure 6:
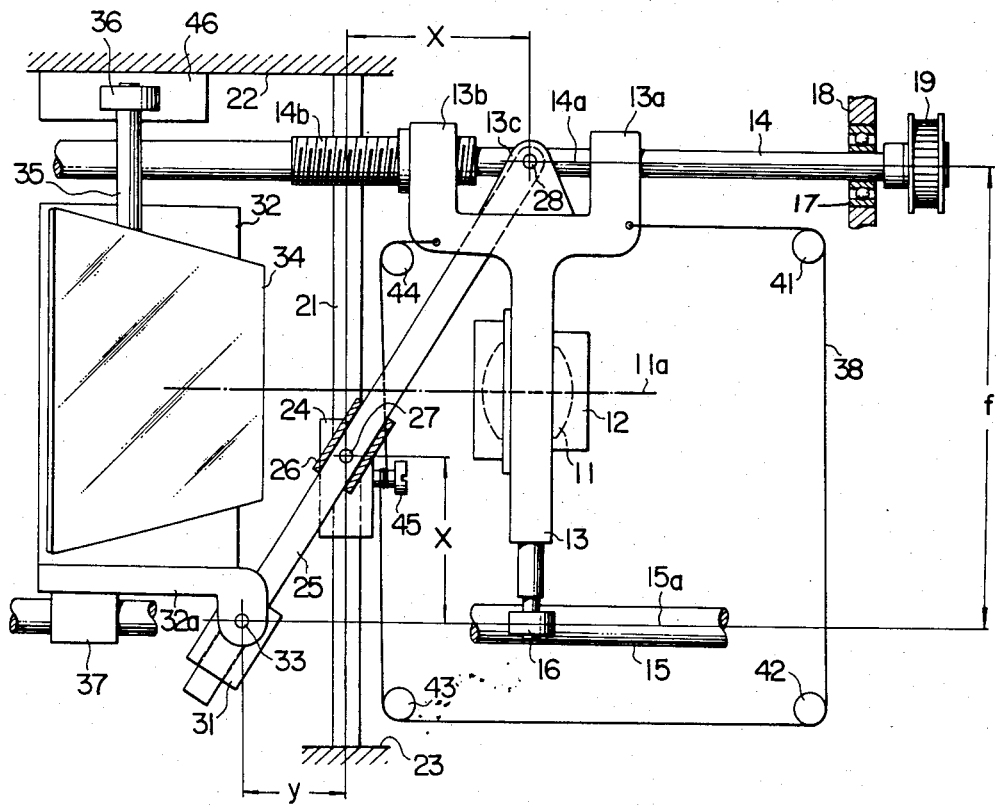
FIG. 6 is a plan view of the device for varying magnification comprising one embodiment of the invention.

FIG. 6 is a plan view of one form of mechanism incorporating therein the aforementioned principle. A lens 11 of a focal length $f$ is housed in a casing 12 and mounted on a lens support member 13 supported at opposite ends by shafts 14 and 15. The support member 13 is forked at one end into two arms 13a and 13b, the former loosely fitting over the shaft 14 and the latter threadably engaging a threaded portion 14a of the shaft 14. The supporter 13 has mounted through a shaft at the other end thereof a roller 16 which rests on the shaft 15. The shafts 14 and 15, which are spaced apart from each other a distance corresponding to the focal length $f$ of the lens 11, are disposed parallel to each other and to the optical axis 11a of the lens 11. The shaft 15 is affixed at opposite ends to an immovable member (not shown) while the shaft 14 is journalled at opposite ends by bearings 17 (only one is shown) affixed to an immovable member 18. A pulley 19 is mounted at one end of the shaft 14 and connected to a drive (not shown). By this arrangement, the lens supporter 13 moves to left and right in FIG. 6 as the shaft 14 rotates.

Disposed at right angles to the two shafts 14 and 15 is a guide member 21 secured at opposite ends to immovable members 22 and 23 respectively. A bush 24 loosely fitted over the guide member 21 and a bush 26 loosely fitted over a connector 25 are connected to each other by a pin 27 for pivotal movement relative to each other. The connector 25 is pivotally supported at one end through a pin 28 by an arm 13c which is integral with the lens support member 13, and the pin 28 is disposed at the point of intersection of the center axis 14a of the shaft 14 with a line 29 extending through the center 0 of the lens 11. Loosely fitted over the other end portion of the connector 25 is a bush 31 which has an arm 32a pivotally supported thereby through a pin 33. The arm 32a supports a reflector support member 32 on which a reflector 34 is mounted and disposed in a position in which it is inclined 45° with respect to the optical axis of the lens 11. The pin 33 is disposed on the center axis 15a of the shaft 15 at all times.

The reflector support member 32 mounts thereon a shaft 35 supporting at one end a roller 36 resting on a rail 46. The support member 32 is formed at one end with two bushes 37 (only one is shown) which are loosely fitted over the shaft 15. Secured to the arms 13a and 13b of the lens support member 13 are opposite ends of a wire 38 which is trained over guide rollers 41, 42, 43 and 44 mounted on an immovable member (not shown). A portion of the wire 38 disposed between the guide rollers 43 and 44 is maintained in engagement with a set-screw 45, so that the bush 24 moves along the guide member 21 when the wire 38 is moved.

In this mechanism, the shafts 14 and 15 are spaced apart from each other a distance corresponding to the focal length $f$ of the lens 11. It should be understood, however, that the invention is not limited to this specific inter-shaft distance, provided that the distance between a line parallel to the optical axis of the lens 11 and including the pin 28 and a line parallel to the optical axis of the lens 11 and including the pin 33 is equal to the focal length $f$ of the lens 11.

In operation, the pulley 19 is driven to rotate by a drive (not shown) so as to rotate the shaft 14. If the lens supporter 13 moves rightwardly a distance X from the center axis of the guide member 21, then the wire 38 also moves the same distance X. Upon movement of the wire 38, the bush 24 is guided by the guide member 21 moves toward the shaft 14 a distance X from the center axis 15a of the shaft 15. At this time, the end of the connector 25 including the pin 28 moves rightwardly the same distance X along the shaft 14 and the central portion thereof moves toward the shaft 14 through the agency of the two bushes 26 and 24. As a result, the connector 25 moves clockwise in pivotal motion about the pin 27 into the inclined position as shown in FIG. 6. When the connector 25 moves to the inclined position, the bush 31 on the connector 25 moves in sliding motion therealong, so that the pin 33 moves leftwardly from the center axis of the guide member 21 a distance Y. As the pin 33 moves the distance Y, the reflector 34 also moves leftwardly from the center axis of the guide member 21 the same distance Y.

The aforementioned movements of the lens 11 and the reflector 34 are the relative movements which satisfy the formula (8) explained with reference to FIG. 4. Upon the movement of the lens 11 the distance X in the direction of its optical axis, the reflector 34 automatically moves the distance Y in the opposite direction, thereby permitting stepless variation of magnification to be effected without requiring to move the surface of the original and the surface of the photosensitive sheet in the direction of the optical axis of the lens. The pulley 19 has been described as being driven to rotate mechanically, but may be driven manually. Also, the line PQ in FIG. 5 has been described as being disposed at right angles to the parallel lines $l$ and $l'$. However, since the two triangles PSR and QST are of similar shape at all times even if the angle formed by the line PQ with the parallel lines $l$ and $l'$ is larger or smaller than 90°, the formula (8) holds at all times. Accordingly, the guide member 21 in FIG. 6 need not be disposed at right angles to the shafts 14 and 15 and the angle formed by the guide member 21 and the parallel shafts 14 and 15 may be either larger or smaller than 90°.

What is claimed is:

1. A device for varying magnification produced by an optical system comprising:
   a. a lens;
   b. means for supporting said lens for movement in the direction of its optical axis;
   c. a reflector;
   d. means for supporting said reflector in an inclined position on the optical axis of said lens and for movement thereon; and
   e. a link means interconnecting said lens and said reflector support means for imparting to said lens and said reflector movements which satisfy the following formula:

$$Y = (X^2/f-X)$$

wherein $f$ is the focal length of the lens, $X$ is the distance covered by the lens in its movement, and $Y$ is the distance covered by the reflector in its movement, said link means comprising:
   i. means for supporting said lens support means and said reflector support means for movement in the direction of the optical axis of the lens;
   ii. a guide member interposed between said lens support means and said reflector support means and disposed approximately at right angles to the optical axis of the lens;
   iii. a connector arranged to intersect said guide member and having one end connected to said lens support means and the other end connected to said reflector support means;
   iv. a movable member fitted over said guide member and connected to said connector at the intermediate portion of said connector so that the connector can move both in pivotal movement and sliding movement, and wherein the distance between the line parallel to the optical axis of the lens and including the center of pivotal movement of the connector relative to the lens support means and the line parallel to the optical axis of the lens and including the center of pivotal movement of the connector relative to the reflector support means is equal to $kf$, wherein $k$ is a proportional constant; and
   v. means for driving said movable member a distance $kX$ along said guide member when said lens support moves a distance $X$ along its supporting means.

2. A device as in claim 1 wherein the distance between said two parallel lines is equal to $f$ and said driving means comprises a wire adapted to transmit the movement of said lens support means to said movable member.

* * * * *